(12) United States Patent
Connors

(10) Patent No.: US 9,222,820 B2
(45) Date of Patent: Dec. 29, 2015

(54) SELF-LEVELING MEASURING DEVICE

(71) Applicant: LIFETIME BRANDS, INC., Garden City, NY (US)

(72) Inventor: James P. Connors, Brooklyn, NY (US)

(73) Assignee: LIFETIME BRANDS, INC., Garden City, NY (US)

( * ) Notice: Subject to any disclaimer, the term of this patent is extended or adjusted under 35 U.S.C. 154(b) by 59 days.

(21) Appl. No.: 14/022,891

(22) Filed: Sep. 10, 2013

(65) Prior Publication Data

US 2015/0068303 A1 Mar. 12, 2015

(51) Int. Cl.
*G01F 19/00* (2006.01)

(52) U.S. Cl.
CPC ............ *G01F 19/002* (2013.01); *G01F 19/007* (2013.01)

(58) Field of Classification Search
CPC ...................................... G01F 19/002
USPC .......................................... 73/426
See application file for complete search history.

(56) References Cited

U.S. PATENT DOCUMENTS

| | | | | |
|---|---|---|---|---|
| 1,175,709 A | * | 3/1916 | Cole | 30/326 |
| 1,249,017 A | | 12/1917 | Brunkhurst | |
| 1,998,969 A | * | 4/1935 | Schauer | 73/426 |
| 2,034,733 A | * | 3/1936 | Wilkins | 73/426 |
| 2,165,045 A | * | 7/1939 | Garside | 73/426 |
| 2,683,374 A | * | 7/1954 | Finley | 73/426 |
| 3,400,591 A | * | 9/1968 | Larson | 73/426 |
| 3,618,751 A | * | 11/1971 | Rich | 206/219 |
| D247,412 S | * | 3/1978 | Montesi | D10/46.3 |
| D443,836 S | * | 6/2001 | Wright | D10/46.3 |
| D450,605 S | * | 11/2001 | Wright | D10/46.3 |
| D554,448 S | * | 11/2007 | Stewart | D7/691 |
| D554,449 S | * | 11/2007 | Stewart | D7/691 |
| 7,441,676 B2 | * | 10/2008 | Pickering, Jr. | 222/460 |
| 8,978,466 B2 | * | 3/2015 | Mohammad | 73/427 |
| 2005/0017028 A1 | * | 1/2005 | Rea | 222/460 |
| 2005/0092641 A1 | * | 5/2005 | Marsden et al. | 206/438 |
| 2012/0198930 A1 | * | 8/2012 | Hood et al. | 73/429 |
| 2012/0222482 A1 | * | 9/2012 | Kern et al. | 73/426 |

OTHER PUBLICATIONS

International Search Report and Written Opinion for International Application No. PCT/US14/54477 mailed on Dec. 15, 2014. (9 pages).

* cited by examiner

*Primary Examiner* — Lisa Caputo
*Assistant Examiner* — Jamel Williams
(74) *Attorney, Agent, or Firm* — Tutunjian & Bitetto, P.C.

(57) ABSTRACT

A self-leveling measuring device is provided. The self-leveling measuring device includes at least two measuring devices each having a measuring cup. The two measuring devices are hinged together at one end so they swivel with respect to each other and are positioned such that the measuring cup of a first device is positioned opposite the measuring device of a second device when the two are positioned over each other. The upper measuring device acts as a leveler for ingredients contained in the lower measuring device by swiveling the upper device over the ingredient filled lower device measuring cup, and can also act as a cover for the ingredient filled lower measuring cup when positioned over the same.

9 Claims, 6 Drawing Sheets

SELF-LEVELING MEASURING DEVICE

BACKGROUND

1. Technical Field

The present principles relate to measuring devices. More particularly, it relates measuring devices for food preparation.

2. Related Art

Measuring devices or spoons are commonly used when baking or preparing other food that requires ingredients to be measured. These measuring spoons often come in different sizes and require the user to manually level the ingredient once contained within the desired measuring spoon. FIGS. 1A and 1B show an example of a measuring spoon 1 having a measured ingredient cup 3 of a predetermined size (e.g., 1 teaspoon). In order to obtain an accurate ingredient measurement, the user fills the cup 3 with the ingredient 7, and uses a straight edge (e.g., knife 5) or their finger to level the top of the ingredients flush with the top of the cup 3.

SUMMARY

According to an implementation, the self-leveling measuring device includes a first measuring device having a first end and a measuring cup of a first predetermined size at a second opposing end thereof, and a second measuring device having a first end and a measuring cup of second predetermined size at a second opposing end thereof. The first ends if the first and second measuring devices are connected by an hinge point so that they two devices can be swiveled with respect to each other.

The measuring cups of the first and second measuring devices have measuring cup openings that are opposite each other such that when the first or second measuring devices are swiveled and positioned over the second or first measuring device, respectively, in a stacked configuration, each measuring device covers the opposing measuring cup opening.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
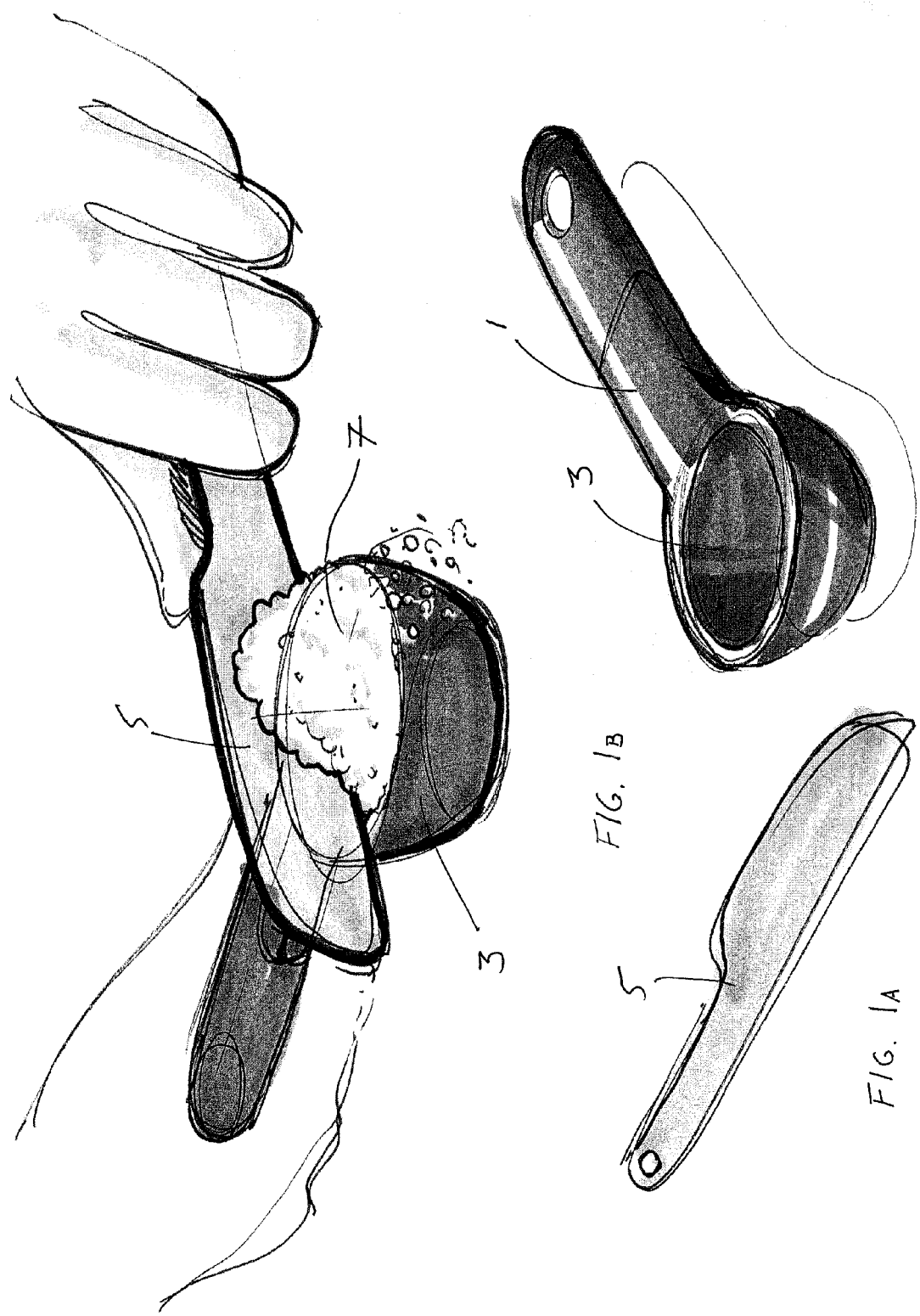
FIGS. 1A-1B are representations of the prior art measuring spoons and the use of the same.
Figure 2:
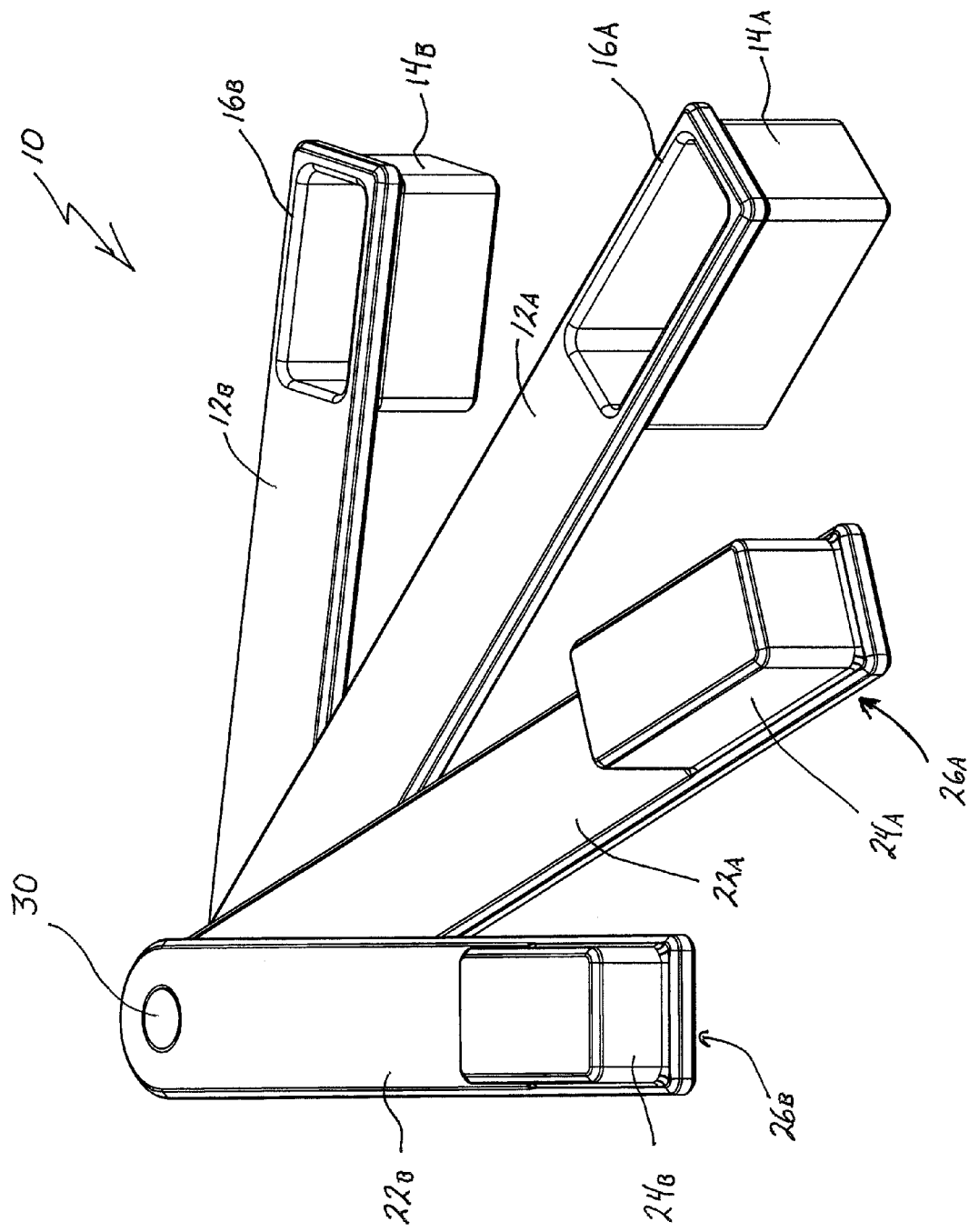
FIG. 2 is a perspective view of the self-leveling measuring device fanned out according to an implementation of the present principles.

The present principles are directed to self-leveling measuring devices for ingredients used in food preparation.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In accordance with the exemplary embodiment shown in FIGS. 2-5, the self-leveling measuring device 10 comes in a set of two or more. Each measurement device acts as a measurement vessel. As will be explained in further detail below, the two oppositely mounted measuring devices act as leveling devices for the measuring devices positioned above and below them, respectively. The hinge or connection point of the measuring devices allows them remain together as a unit, as well as to allow the them to swivel freely from one another in order to perform the leveling and covering functions of the same.

In accordance with a preferred implementation of the present principles, only two measurement devices are necessary to achieve the intended functions of the same, however, those of skill in the art will appreciate that four measurement devices reflect a typical set of measurement spoons. As such the following is described in the context of four measuring devices. However, those of skill in the art will appreciate that more than four measuring devices can be implemented with the present principles.

In the example shown there are four measuring devices, two center devices 12A and 22A, and two outer devices 12B and 22B. The measuring devices include corresponding measuring cups or vessels 14A, 14B, 24A and 24B for receiving to be measured ingredients. The measuring devices 12A, 12B, 22A and 22B are attached at a hinge point 30, and are configured such that the two center devices 12A and 22A are the same overall length $L_c$ with different size measuring cups 14A and 24A that have their corresponding openings 16A and 26A opposite each other (See FIGS. 3 and 4). The outer measuring devices 12B and 22B are configured to swivel adjacent their corresponding center device 12A and 22A, respectively.

Figure 4:
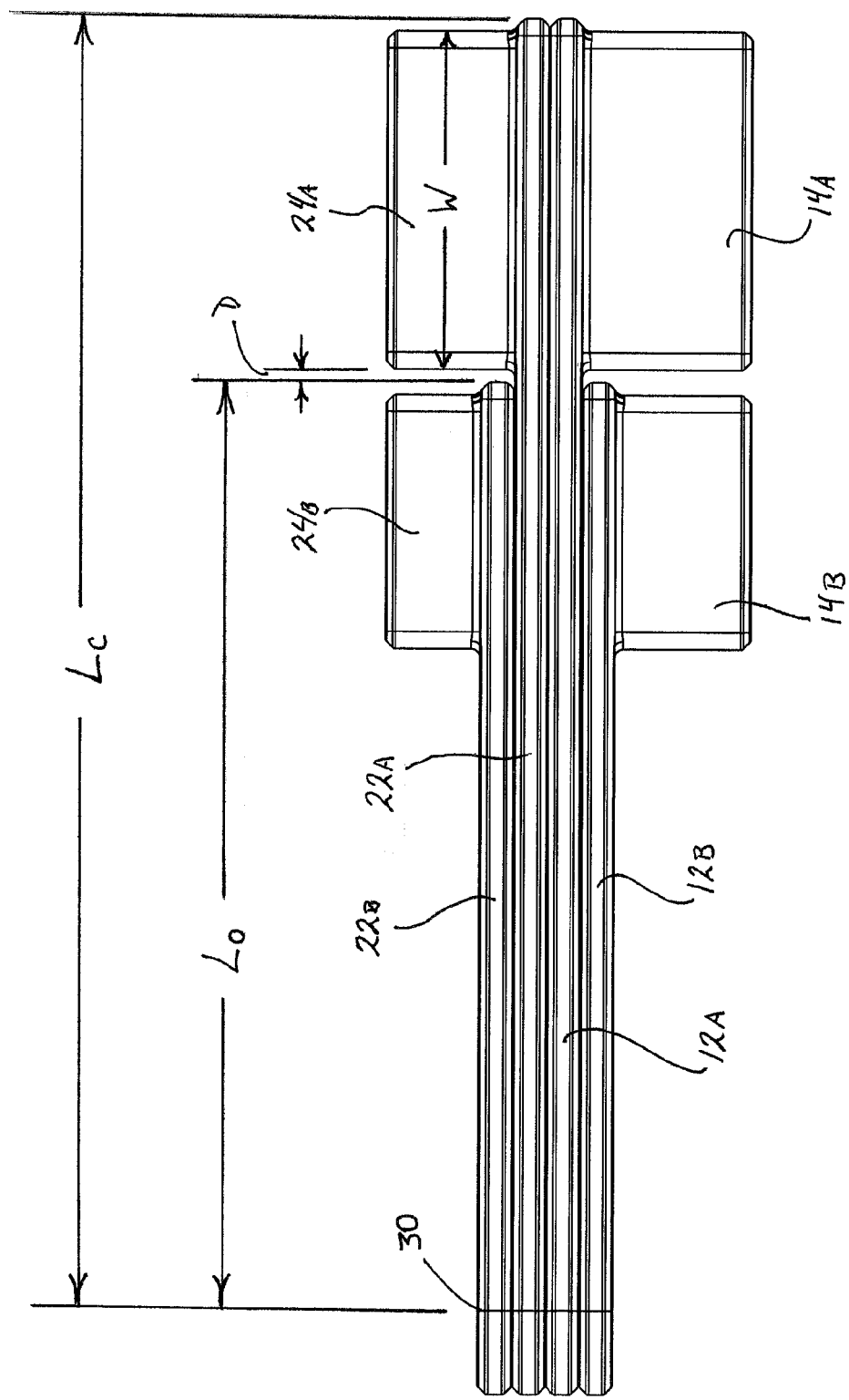
FIG. 4 is a side view of the self-leveling measuring device in a closed position, according to an implementation of the present principles.

As shown in FIG. 4, the outer measuring devices have a length $L_o$ such that the measuring cups/vessels 14B and 24B of the same are offset from the center device measuring cups/vessels 14A and 24A by a small distance D. In order to provide the self-leveling and cover functions of the present principles, the two center measuring devices 12A and 22A preferably have the same overall length $L_c$ from the connection or hinge point 30, such that they can cover each other and be used to level the ingredients in the opposing measuring cup/vessel 14A and 24A when swiveled over each other.

Figure 3:
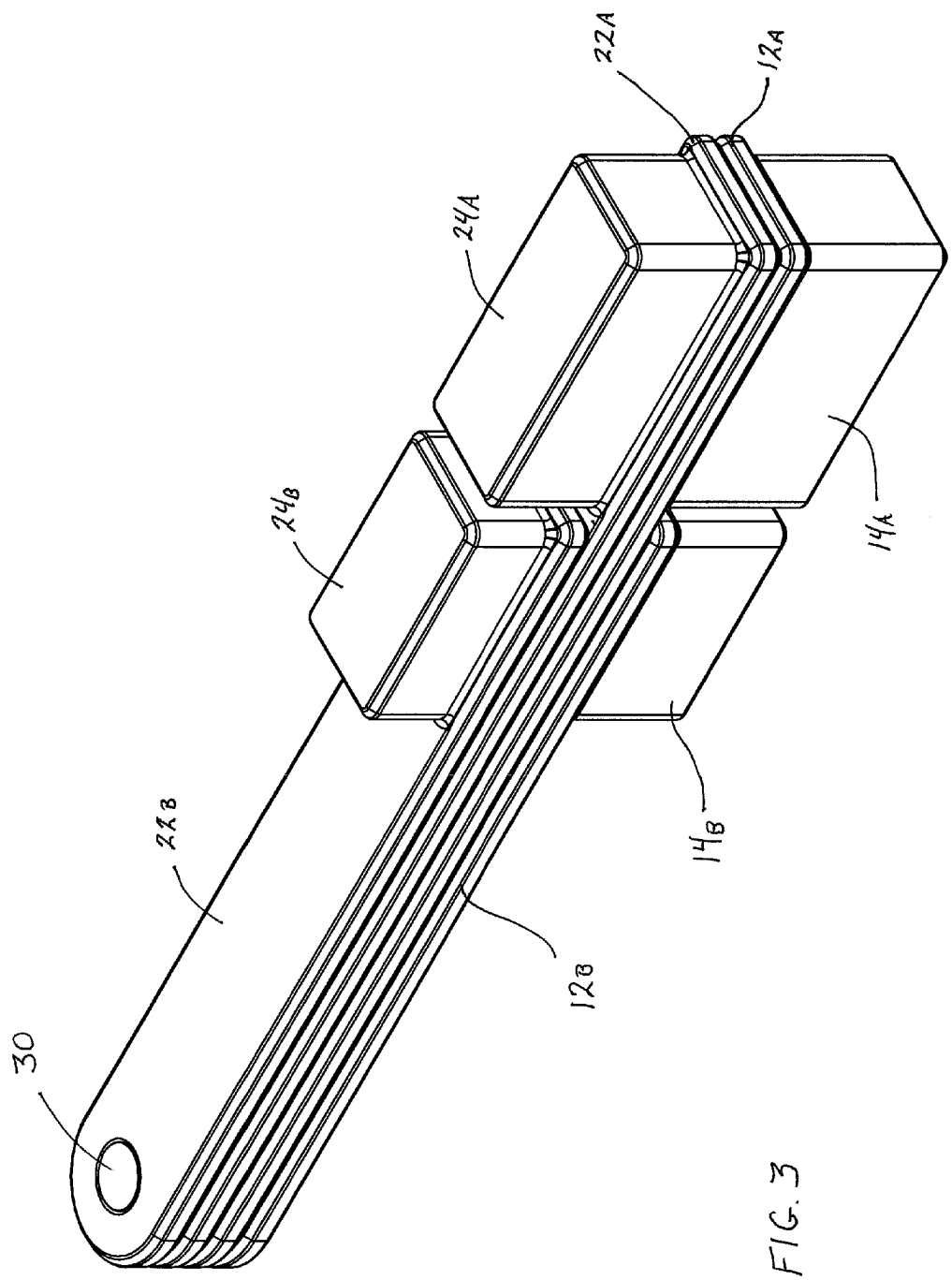
FIG. 3 is a perspective view of the self-leveling measuring device in a closed position, according to an implementation of the present principles.

In the present example shown in FIG. 4, the outer measuring devices 12B and 22B are shown having the same overall length $L_o$ which is desired for aesthetic reasons of the product, but is not necessarily required for providing the self-leveling and cover functions of the same. FIGS. 3 and 4 show an example of the self-leveling device 10 in its completely nested or closed positions.

To use the measuring device 10 of the present principles, one selects the size of the measuring device they want to use and scoops a food item for measurement. As will be described, the two center devices 12A and 22A enable the self-leveling functions of the device.

For example, if a center device (i.e., 12A or 22A) is filled with an ingredient, the center device which mirrors it (i.e., 22A or 12A, respectively) is swiveled over the ingredient filled device to level the ingredients contained in the measuring cup/vessel (14A or 24A) of the same.

If an outer measuring device (i.e., 12B or 22B) is filled with an ingredient, the arm of the closest center measuring device above it (i.e., 12A or 22A, respectively) is swiveled over the outer device's measuring cup (14B or 24B) to level the ingredients contained in the same.

In accordance with one preferred implementation of the present principles, once the ingredients are leveled, the measuring device which has acted as a leveler can also now act as a cover for the filled measuring portion below it to avoid spills. By way of example, when measuring cup/vessel 14A is filled, the measuring device 22A and corresponding measuring cup/vessel 24A acts as a cover for the same. Correspondingly, if measuring cup/vessel 14B is filled, the arm of the measuring device 12A acts as the cover for the same. As is evident, when the device is turned over, the other measuring devices 22A and 22B can be used just as their counterparts 12A and 12B. FIG. 4 shows that the measuring cups 14A, 14B, 24A and 24B are all different sizes. Those of skill in the art will appreciate that these sizes can be varied according to the intended uses or applications without departing from the spirit of the present principles.

Figure 5:
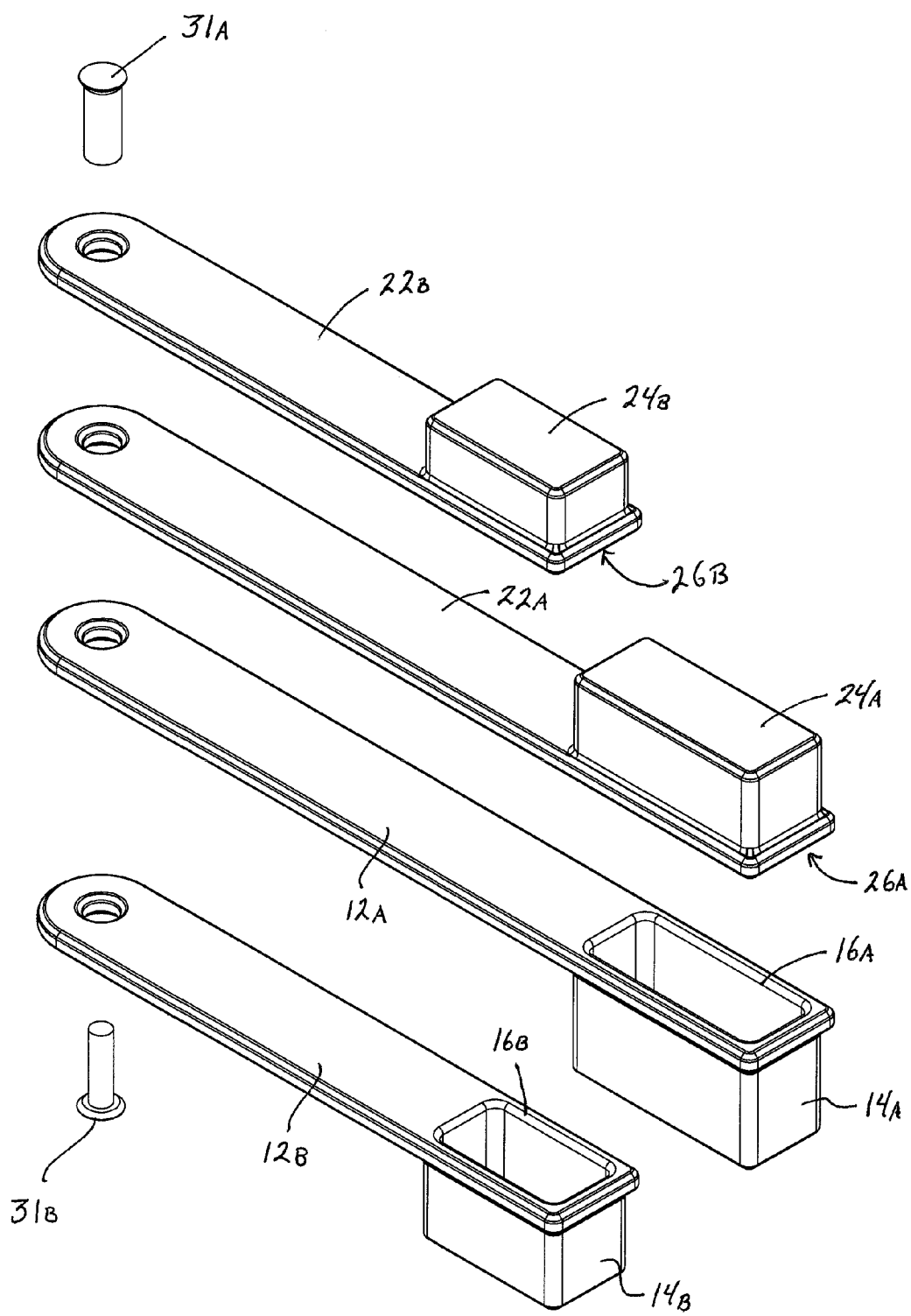
FIG. 5 is an exploded perspective view of the self-measuring device according to an implementation of the present principles.

Referring to FIG. 5, in one implementation, the hinge 30 is a two piece pin 31 running through the ends of the spoons (See FIG. 5). Pin 31 keeps the measuring devices attached and gives them the ability to swivel freely from one another. Those of skill in the art will appreciate that the hinge point 30 can be achieved in a multitude of ways without departing from the intended scope of the present principles. In another implementation, the hinge pin 31 could be molded into one of the measuring devices so as to eliminate the need for a separate pin fastener. In addition, the pin 31 could have a hole there through to facilitate hanging of the self-leveling measuring device 10 when not in use. In any configuration, it is preferred to be able to separate the measuring devices from the hinge to assist in cleaning the devices when the user is finished with the same.

Figure 6:
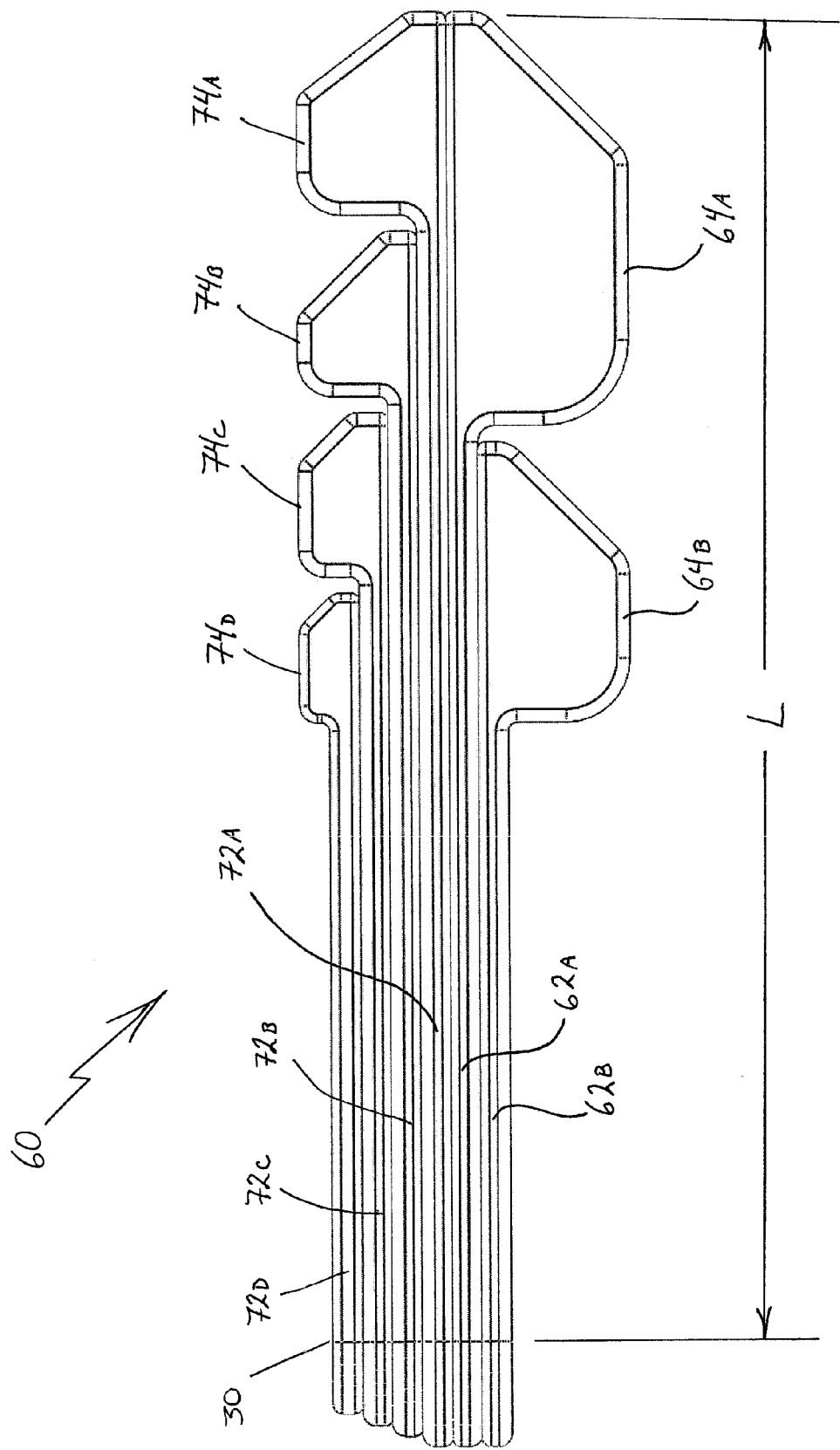
FIG. 6 is a side view of the self-leveling measuring device in a closed position according to yet another implementation of the present principles.

FIG. 6 shows yet another implementation of the measuring device 60 according to the present principles. In this example, there are six (6) measuring devices (62, 72) with six (6) different sized measuring cups (64, 74). As will be evident, from this implementation, only the two opposing measuring devices 62A and 72A are of the same length L from the hinge or connection point 30. All other measuring devices 62B, 72B, 72C and 72D can be different lengths with respect to each other and/or the hinge/connection point 30.

When one is finished using the measuring devices, they can be scrubbed in soap and rinsed in water or run through the dishwasher. For storage, the measuring cups are oriented with one cup on top of the other so that the large cups are covering one another's chambers and the smaller cups are covered by the handle of the larger spoons (See FIGS. 3 and 4).

In accordance with alternative implementations, the measuring devices 12 and 22 do not have to be straight and could be curved or have some other desirable shape. In addition, the measuring cups/vessels 14 and 24 do not have to be rectangular, and can also take other shapes as desired.

Those of skill in the art will appreciate that the measuring device 10 and the parts thereof can be fabricated using one or more of many different materials. Examples of such materials include, but are not limited to, plastic, metal, wood, ceramic or any other structurally sound food safe material.

Although described in the context of food preparation, those of skill in the art will appreciate that the self-leveling measuring devices of the present principles can be used for other applications as well. For example, for scientific purposes to measure certain dry substances used in a scientific experiment. Another application could be in manufacturing for the measurement of raw materials to build or make something. Also the may be used for Chemical or pharmaceutical manufacturing.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A self-leveling measuring device comprising:
a first measuring device having a first distal end and a measuring cup of a first predetermined size at a second opposing end thereof;
a second measuring device having a first distal end and a measuring cup of second predetermined size at a second opposing end thereof;
a hinge point connecting the first distal ends of the first and second measuring devices in a swivel arrangement with respect to each other, and
a third measuring device disposed immediately adjacent said first or second measuring device and having a first end coupled to the hinge point and a third measuring cup of a third predetermined size at a second opposing end thereof, said measuring cup of the third measuring device having an opening;
wherein the measuring cups of the first and second measuring devices have measuring cup openings that are opposite each other such that when the first or second measuring devices are swiveled and positioned over the second or first measuring device, respectively, in a stacked configuration, each measuring device covers the opposing measuring cup opening;
wherein said third measuring device comprises a length shorter than a length of the adjacent first or second measuring device such that the opening of the third measuring cup is covered by the adjacent first or second measuring device when the first or second measuring device is swiveled and positioned over the third measuring cup.

2. The self-leveling measuring device of claim 1, wherein ingredients contained in the first or second measuring cup is leveled by swiveling the second or first measuring device, respectively, over the ingredient containing first or second measuring cup.

3. The self-leveling measuring device of claim 1, wherein ingredients contained in the third measuring cup is leveled by swiveling the adjacent first or second measuring device over the opening of ingredient containing third measuring cup.

4. The self-leveling measuring device of claim 1, further comprising:
   a fourth measuring device disposed immediately adjacent said second or first measuring device and having a first end coupled to the hinge point and a fourth measuring cup of a fourth predetermined size at a second opposing end thereof, said measuring cup of the fourth measuring device having an opening;
   said fourth measuring device having a length shorter than a length of the adjacent second or first measuring device such that the opening of the fourth measuring cup is covered by the adjacent second or first measuring device when the second or first measuring device is swiveled and positioned over the fourth measuring cup.

5. The self-leveling measuring device of claim 4, wherein ingredients contained in the fourth measuring cup is leveled by swiveling the adjacent second or first measuring device over the opening of ingredient containing fourth measuring cup.

6. The self-leveling measuring device of claim 1, wherein said first measuring device comprises a first length and said second measuring device comprises a length equal to said first length.

7. The self-leveling measuring device of claim 4, wherein said third measuring device and said fourth measuring device have equal lengths.

8. The self-leveling measuring device of claim 4, wherein said third measuring device and said fourth measuring device have unequal lengths.

9. A self-leveling measuring device comprising:
   a first measuring device having a first end and a first measuring cup at a second opposing end thereof, said measuring cup of the first measuring device having an ingredient receiving opening, said first measuring device having a first length;
   a second measuring device having a first end and a second measuring cup at a second opposing end thereof, said second measuring cup having an ingredient receiving opening, said second measuring device having a length equal to the first length;
   a third measuring device disposed immediately adjacent said first measuring device and having a first end and a third measuring cup at a second opposing end thereof, said third measuring cup having an ingredient receiving opening, said third measuring device having a second length less than said first length; and
   a fourth measuring device disposed immediately adjacent said second measuring device and having fourth measuring cup of at a second opposing end thereof, said fourth measuring cup having an ingredient receiving opening, said fourth measuring device having a second length less than said first length; and
   a hinge point connecting the first ends of the first, second, third and fourth measuring devices in a swivel arrangement with respect to each other,
   wherein the first and second measuring cup openings are configured to be postionable opposite each other such that when the first or second measuring devices are swiveled over the other of the second or first measuring device, respectively, the first or second measuring device operates to level ingredients contained in the second or first measuring cup, respectively,
   wherein the third and fourth measuring cup openings are configured to be positionable under the first and second measuring devices, respectively, such that when the first or second measuring devices are swiveled over the third or fourth measuring cup, the first or second measuring devices operate to level ingredients contained in the third or fourth measuring cups, respectively, or they can operate to cover the third or fourth measuring cup openings, respectively, when positioned in a stacked configuration.

* * * * *